US007126776B1

(12) United States Patent
Warren, Jr. et al.

(10) Patent No.: US 7,126,776 B1
(45) Date of Patent: Oct. 24, 2006

(54) DISK DRIVE HAVING A SECTOR CLOCK THAT IS SYNCHRONIZED TO THE ANGULAR SPEED OF THE SPINDLE MOTOR

(75) Inventors: Robert W. Warren, Jr., Loveland, CO (US); Mark D. Hagen, Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 494 days.

(21) Appl. No.: 10/125,131

(22) Filed: Apr. 17, 2002

(51) Int. Cl.
*G11B 5/09* (2006.01)
(52) U.S. Cl. ...................................................... 360/51
(58) Field of Classification Search ................... 360/51
See application file for complete search history.

(56) References Cited

U.S. PATENT DOCUMENTS

| RE294,321 | 10/1977 | Desai | |
| 4,808,884 A | 2/1989 | Hull et al. | |
| 5,307,216 A * | 4/1994 | Cook et al. | 360/72.1 |
| 5,311,376 A | 5/1994 | Joan et al. | |
| 6,081,397 A * | 6/2000 | Belser | 360/51 |
| 6,583,944 B1 * | 6/2003 | Wilson et al. | 360/51 |

OTHER PUBLICATIONS

Kubo, M. Okada, K Okutso, K, Spindle Rotation Velocity Monitor by Sector Interval Analysis, IBM Technical Disclosure Bulletin, May 1993.

* cited by examiner

*Primary Examiner*—Wayne Young
*Assistant Examiner*—Daniell L. Negrón
(74) *Attorney, Agent, or Firm*—Jason T. Evans, Esq.; Young Law Firm

(57) ABSTRACT

The present invention compensates for variations in the angular velocity of the drive's spindle motor by periodically dropping clocks to a counter based upon the previous servo wedge-to-wedge timing. This enables a substantially constant count to be maintained between servo wedges and allows a more predictable generation of the data sector pulses. A more predictable generation of the data sector pulses enables the size of the guard band preceding each data sector to be decreased and the capacity of the disk to be correspondingly increased.

2 Claims, 5 Drawing Sheets

DISK DRIVE HAVING A SECTOR CLOCK THAT IS SYNCHRONIZED TO THE ANGULAR SPEED OF THE SPINDLE MOTOR

BACKGROUND OF THE INVENTION

1. Field of the Invention

The present invention relates to disk drives. More particularly, the present invention relates to disk drives that vary the timing of the servo detect window according to measured variations in the angular velocity of the drive's spindle motor.

2. Description of the Prior Art

Figure 1:
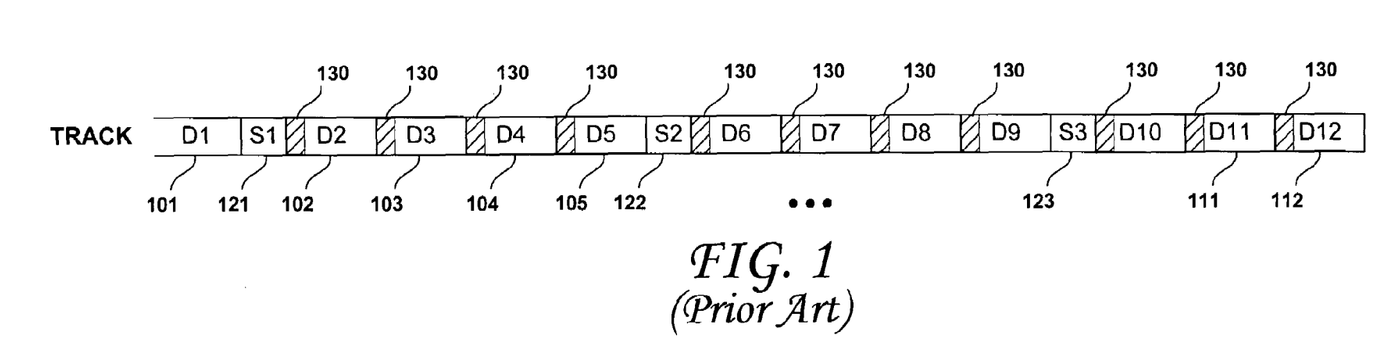
FIG. 1 is a simplified representation of the structure of a track on the recording surface of a disk of a magnetic hard disk drive.

In contemporary magnetic hard disk drives, servo sectors of servo information are interspersed with data sectors circumferentially in concentric tracks around the surfaces of the disk or disks. As shown in FIG. 1, the format of a track of a rigid magnetic disk drive calls for regularly spaced embedded servo sectors (also called servo wedges) (of which representative servo sectors 121, 122, 123 are shown) containing servo information therein. Between the embedded servo sectors are a number of data sectors. There may be an integer number of data sectors between any two servo sectors. However, a track may also include a non-integer number of data sectors between adjacent servo sectors, as some of the data sectors may be split across servo sectors.

Figures 2, 3:
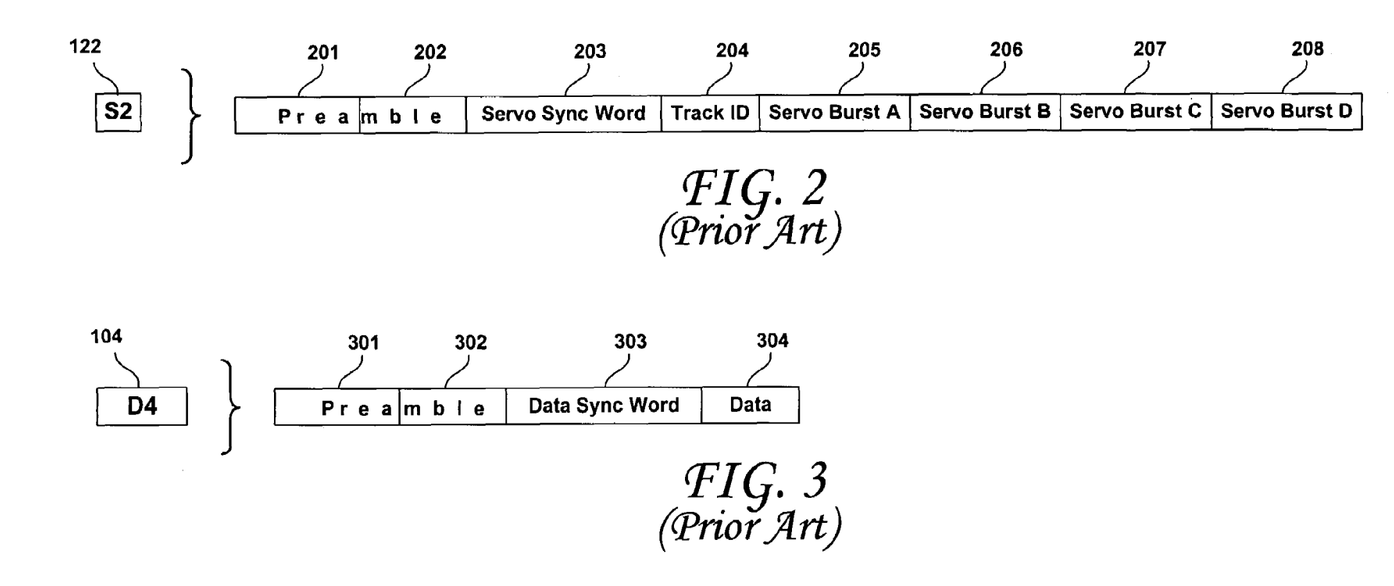
FIG. 2 is a diagram of an exemplary structure of a servo sector (also called a servo wedge) recorded on the recording surface of a disk of a magnetic hard disk drive.
FIG. 3 is a diagram of an exemplary structure of a data sector recorded on the recording surface of a disk of a magnetic hard disk drive.

As shown in FIG. 2, a servo sector (exemplary servo sector S2 122 being shown for illustrative purposes only, it being understood that all of the servo sectors shown in FIG. 1 have the same format) may include a preamble 201, 202, a servo sync word 203, a track identifier 204 and servo burst fields A, B, C and D, referenced by numerals 205, 206, 207 and 208, respectively. The preamble 201, 202 may, for example, include a first portion 201 that includes a fill code to enable the read channel to adjust is gain and allows a phase locked loop (PLL) to achieve bit synchronization with the incoming servo information. The preamble may also include a second portion 202 that includes a DC erase portion in which there are no logical transitions (such as an uninterrupted string of zeros, for example) for a specified length. As areas containing no transitions are illegal everywhere else on the disk, the DC erase field uniquely identifies this portion as being part of a servo sector. Following the preamble 201, 202 is a servo sync word 203 that identifies the sector as being a servo wedge and that establishes byte synchronization. After the servo sync word 203 is a track identifier (ID), which uniquely identifies the number of the track being read. The servo burst fields 205, 206, 207 and 208 are used to determine the head's current location on the track. The detection of the servo sync word establishes a positive timing reference and allows a disk controller integrated circuit to forecast the timing of the next servo sync word, since they are equally spaced along the tracks recorded on the recording surface of the disk or disks and since the nominal angular velocity of the disk is known.

A spindle motor drives the disk or disks in rotation. However, the spindle motor does not, in practice, drive the disks at a perfectly constant angular velocity. Indeed, there are some variations in the angular velocity at which the spindle motor drives the disk in rotation. Such variations may cause the detection of the servo sync words to be read later (in the case wherein the spindle motor has slowed down relative to its nominal speed) or earlier (in the case wherein the spindle motor is driving the disk faster than its nominal angular velocity) than forecast.

The disk controller, to detect the servo sync word, opens up a timing window during a servo gate signal (not shown), which enables the read channel to begin the detection of the preamble of the servo sector, in order to establish gain, achieve bit synchronization and the like. The controller also opens another timing window for the detection of the servo sync word. This timing window is made as narrow as possible within the constraints of the variations in the angular velocity of the spindle motor, to reduce the possibility of a false detection of the servo sync word. If the servo sync word is made unique and the timing window for its detection is made as narrow (is opened only for a short duration), the probability of a false detection is relatively low.

During most of the operation of the drive, the controller operates in hard sector mode. In hard sector mode, upon detection of a servo sync word, a fixed interval is established for the detection of the next servo sync word in the next servo sector. After the fixed interval has elapsed, the controller opens up the window to detect the next servo sync word. The fixed interval may be established by a counter that is decremented until it reaches zero, for example. If the drive has, for any reason, lost synchronization or is just starting up and has not yet achieved synchronization, the drive may operate in a soft sector mode. In soft sector mode, the controller may not know the location of the read/write heads over the disk. In soft sector mode, the servo gate signal is opened up and the drive looks for the next preamble, track ID and servo sync word. Once several servo sync words have been detected and synchronization is achieved, the drive may switch to hard sector mode.

The detection of the servo sector and of the servo sync word within the servo sector, therefore, is essential as it allows the controller to predictably determine the start of the data sectors on the track.

FIG. 3 is a diagram of an exemplary structure of a data sector recorded on the recording surface of a disk of a magnetic hard disk drive. Exemplary data sector 104 (exemplary data sector D4 104 being shown for illustrative purposes only, it being understood that all of the data sectors shown in FIG. 1 have the same format) includes a preamble 301, 302, followed by data sync word 303 and the data 304. The read channel decodes each data sector and the data sync word establishes when the data 304 may be clocked in (writing) or out (reading). The aforementioned speed variations in the angular velocity of the spindle motor require that guard bands 130 (FIG. 1) be included before each data sector. The width of the guard bands is a function of the variation in spindle motor speed between writing data to that sector and subsequently reading the data back. Indeed, the width of the guard band is related to the minimum to maximum spindle motor speed variation, as well as the time interval between re-synchronizing the sector timing logic upon detection of the servo sync word. As the read/write head moves away from the detected servo sync word, the uncertainty (it is a sampled system) of the location of a sector is the difference between the actual angular velocity of the spindle motor and the nominal speed thereof, and increases in linear fashion. This results in maximum uncertainty just before the detection of the next servo sync word. The wider the guard bands are, the more disk real estate is made unavailable for storing data. Therefore, if the width of the guard bands could be reduced, comparatively more data could be stored on the disks.

What is desired, therefore, are disk drives that enable the width of the guard bands to be decreased and the capacity of the disk media to be increased, given the constraints imposed by the aforementioned variations in the angular velocity of the spindle motor.

SUMMARY OF THE INVENTION

Accordingly, this invention may be regarded as a disk drive, including a spindle motor and a disk that includes a recording surface having a track that includes a first servo wedge and a second servo wedge and a first addressable location and a second addressable location, each of the servo wedges and each of the addressable locations having a leading end and a trailing end, the disk being driven by the spindle motor to rotate at an angular velocity that is subject to variation, the first addressable location having both its leading end and trailing end between the trailing end of the first wedge and the leading end of the second wedge, and the second addressable location having its leading end between the trailing end of the first wedge and leading end of the second wedge. A head is provided for performing an operation in which the head is maintained adjacent the track and produces a read signal that has multiple servo phases and multiple data phases such that during a first servo phase the read signal represents data read from the first servo wedge and during a second servo phase represents data read from the second servo wedge, the variation in angular velocity of the spindle motor causing a timing variation in the amount of time elapsing between the first servo phase and the second servo phase. A controllable clock generator produces a stream of clock pulses having an adjustable pulse repetition frequency, the clock generator operating on a sampled-data basis to respond to the read signal to adjust the pulse repetition frequency during the servo phases so that during the data phases the pulse repetition frequency remains substantially constant and is a function of the angular velocity of the spindle motor. Timing circuitry responsive to the clock pulses produces timing signals to control access to the addressable locations.

The controllable clock generator may includes an intra-wedge counter that maintains a substantially constant count between the first and second servo sync words, an output of the intra-wedge counter controlling when a reading of the first and second data sync word is enabled, and a gated clock generating circuit responsive to the variation in the angular velocity of the spindle motor to generate a gated clock signal that is input the intra-wedge counter, the gated clock signal causing the intra-wedge counter to increment when asserted and causing the intra-wedge counter to not increment when the gated clock signal is not asserted. The gated clock generating circuit may include circuitry configured to compare an output of the intra-wedge counter with a comparison count value that corresponds to a fast spindle motor and wherein a result of the comparison determines whether the gated clock signal is asserted.

The present invention is also a disk drive, including a spindle motor and a disk including a recording surface having a track that includes a first servo wedge including a first servo sync word and a first data sector including a first data sync word; and a second servo wedge that including a second servo sync word and a second data sector including a second data sync word, the disk being driven by the spindle motor to rotate at an angular velocity that is subject to variation. A head is provided for performing an operation in which the head is maintained adjacent the track and produces a read signal that has multiple servo phases and multiple data phases such that during a first servo phase the read signal represents data read from the first servo wedge and during a second servo phase represents data read from the second servo wedge, the variation in angular velocity of the spindle motor causing a timing variation in the amount of time elapsing between the first servo phase and the second servo phase. A controllable intra-wedge counter for maintains a substantially constant count between the first and second servo sync words, an output of the intra-wedge counter controlling when a reading of the first and second data sync word is enabled, and a gated clock generating circuit responds to the variation in the angular velocity of the spindle motor to generate a gated clock signal that is input the intra-wedge counter, the gated clock signal causing the intra-wedge counter to increment when asserted and causing the intra-wedge counter to not increment when the gated clock signal is not asserted.

The gated clock generating circuit may include circuitry configured to compare an output of the intra-wedge counter with a comparison count value that corresponds to a fast spindle motor and wherein a result of the comparison determines whether the gated clock signal is asserted.

The present invention is also a disk drive, including a spindle motor and a disk including a recording surface having a track that includes a first servo wedge including a first servo sync word and a first data sector including a first data sync word; and a second servo wedge that including a second servo sync word and a second data sector including a second data sync word, the disk being driven by the spindle motor to rotate at an angular velocity that is subject to variation. A head is provided for performing an operation in which the head is maintained adjacent the track and produces a read signal that has multiple servo phases and multiple data phases such that during a first servo phase the read signal represents data read from the first servo wedge and during a second servo phase represents data read from the second servo wedge, the variation in angular velocity of the spindle motor causing a timing variation in the amount of time elapsing between the first servo phase and the second servo phase. An intra-wedge counter generates a count representative of the amount of time elapsing between the first and second servo sync words, the intra wedge counter being clocked by a clock signal. A multiplier generating circuit generates a multiplier signal that varies according to the count in the intra-wedge counter, and a phase lock loop frequency multiplier circuit generating a time base clock that is adapted to provide a controller of the disk drive with a time base clock signal that varies according to the multiplier signal.

The phase lock loop frequency multiplier may multiply the clock signal, divided by a divisor, by the multiplier signal to generate the time base clock signal.

The foregoing and other features of the invention are described in detail below and set forth in the appended claims.

DESCRIPTION OF THE PREFERRED EMBODIMENTS

The present invention enables the generation of more predictably timed sector pulses by accounting for variations in the actual spindle motor speed from its nominal value. If the sector pulses are generated more predictably, the width of the guard bands around the data sectors may be decreased. In turn, if the width of the guard bands is decreased, more data can fit in between servo wedges and the capacity of the drive can be increased. The present invention, according to an embodiment thereof, measures the actual angular velocity of the spindle motor by measuring the actual time between servo sync words.

The present invention also exploits the physical characteristics of the spindle motor to reduce the size of the guard bands around the data sectors. One such characteristic is the inertia of the spindle assembly, which has been found to minimize angular velocity variations greater than the first harmonic of its rotational frequency. Since the servo wedge sample rate is about 30 to about 300 times faster than such variations, it is possible to use the measured speed from one or more previous wedge-to-wedge timings to estimate the speed for the next wedge-to-wedge time. Using this computation, the data sector pulses may be generated more predictably upon the detection of the data sync words. In turn, a more predictable timing of the data sector pulses means that the size of the guard band preceding each data sector may be decreased. As increased BPI allows a greater number of data sectors to fit between servo wedges, this ability to reduce the size of the data sector guard bands becomes significant. For example, at 750 Mb/sec data rate and a 15 kHz servo sample rate, a 0.1% variation in the angular velocity of the spindle motor corresponds to a 1.8% capacity loss, as detailed immediately below:

| Spindle Motor Speed Variation | 0.10% | | 0.067 μsec/wedge |
|---|---|---|---|
| Servo Sample Rate | 15 | kHz | 66.667 μsec/wedge |
| Servo Wedge Time | | | 4.000 μsec |
| Data Rate | 750 | Mb/sec | 93.750 Mb/sec |
| Sector Size | 574 | bytes | 6.123 μsec/sector |
| Sector/Wedge Without Spindle Motor Speed Variation | 10.235 | sectors | |
| Sector/Wedge With Spindle Motor Speed Variation | 10.049 | sectors | 1.82% Capacity Loss |

Therefore, there is a significant disk capacity that could be reclaimed if the width of the guard bands were to be reduced. Toward that end, the present invention calls for disk drives configured to measuring the wedge-to-wedge timing variation (the variation from a servo sync word to the next servo sync word caused by variations in the angular velocity of the spindle motor) and to generate a synchronous clock signal from which to generate more accurate timing signals to enable the timely reading of the data sectors. For example, the present invention enables the generation of a synchronous clock signal from which highly accurate sector pulses may be generated, indicating the decoding of the data sector sync mark. Two illustrative embodiments of such drives are presented below.

Figure 4:
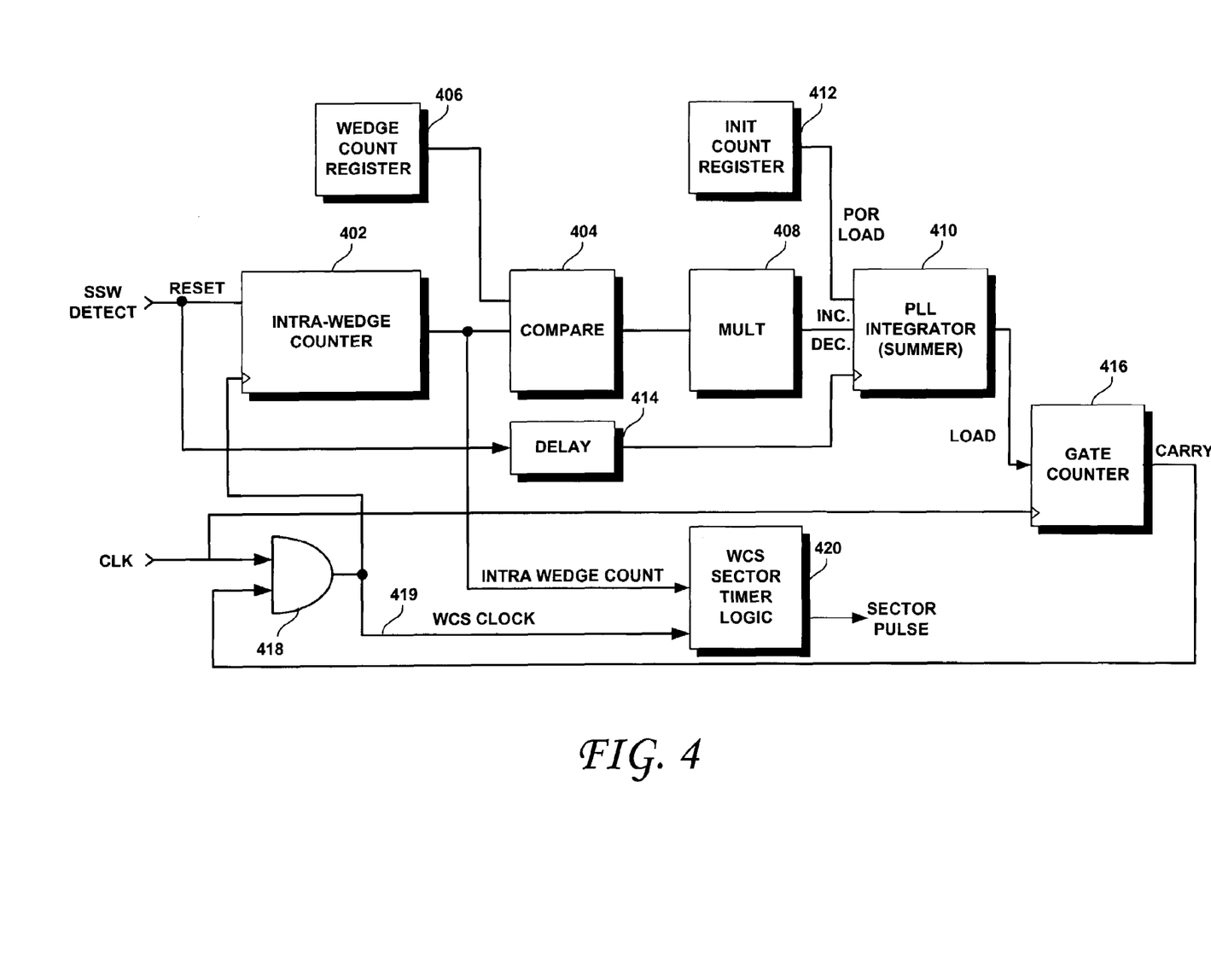
FIG. 4 is a diagram of a timing circuit for compensating for variations in the angular velocity of the drive's spindle motor and for producing timing signals to control access to addressable locations on the disk, according to an embodiment of the present invention.

A consistent wedge-to-wedge count may be obtained, according to the present invention, by periodically dropping clocks to a controllable clock generator that is configured to produce a stream of clock pulses having an adjustable pulse repetition frequency, based upon a previous wedge-to-wedge timing. FIG. 4 is a diagram of a timing circuit for doing this. FIG. 4 is a diagram of a timing circuit for compensating for variations in the angular velocity of the drive spindle motor and for producing timing signals to control access to addressable locations within a data sector on the disk, according to an embodiment of the present invention. As shown therein, the timing circuit 400 includes an intra-wedge counter 402. The intra-wedge counter 402 is clocked by a clock signal on its clock input and reset upon the assertion of the Servo Sync Word (SSW) detect signal. If no control were to be applied to the clock of the intra-wedge counter 402, the counter 402 would count to a maximum count for the spindle motor's lowest angular velocity and the counter 402 would count to a minimum count for the spindle motor's highest angular velocity. A wedge count register 406 stores a comparison value that is compared against the count in the intra-wedge counter 402 by comparator 404. The comparison value stored in the wedge count register 406 may be advantageously selected to be a value that corresponds to the minimum count of a slowest spindle motor. Alternatively, the value stored in the register 406 may be less than such minimum count. The output of the comparator 404 is fed to an amplifier 408 which, depending upon the output thereof (which indicative of whether the spindle motor is fast or slow), either decrements or increments the current count in the Phase Lock Loop (PLL) integrator counter 410. The PLL integrator counter is clocked by a delayed SSW detect signal, causing it to integrate the error from the previous wedge-to-wedge timing. As the incremental changes in spindle motor velocity from wedge to wedge are very small (because of the spindle motor's inertia and the small wedge-to-wedge time interval at the spindle motor's high angular velocity), it is necessary to integrate these small incremental velocity changes to obtain an indication of whether the spindle motor is fast or slow, A register 412 establishes the initial condition (corresponding to the nominal speed of the spindle motor) of the PLL integrator counter 410, which initial condition is loaded into the counter 410 upon reset. The error output of the PLL counter 410 is input to a gate counter 416 that is clocked by a system clock signal. The system clock is output from a PLL (not shown) that is synchronized the frequencies detected on the spinning disk. As long as the integrated error in the PLL counter 410 is greater than the count value stored in the gate counter 416, the gate count will output a logical 1 on its "Carry" output, which logical 1 is fed to one input of a two input AND gate 418. The other input to the AND gate 41 is the system clock. The ANDed output of gate 418 clocks the intra-wedge counter 402. Therefore, as long as a logical one is output from the gate counter 416, the intra-wedge counter 402 will increment at each system clock pulse and will be reset upon the eventual assertion of the SSW signal.

However, when the integrated error in the PLL counter 410 is less than the count in the gate counter 416, the "Carry" output thereof will be a logical 0. This condition is indicative of a slow spindle motor, and the generation of the timing signals to control access to addressable locations on the disk should be delayed by an amount of time corresponding to the magnitude of the variation ion the spindle motor during the previous wedge-to-wedge timing. Such timing signals may include the timing of the window during which the read channel looks for and decodes the data sync byte, which decode causes the controller to generate the data sync word signal. The generation of a logical zero from the gate counter 416 will cause a logical 0 to be output from the AND gate 418. This will cause the intra-wedge counter 402 to not increment during the system clock pulse(s) that occur when the output of the gate counter 416 is a logical 0. This causes the intra-wedge counter 402 to periodically "drop clocks" without changing the frequency of the system clock pulses. The output of the intra-wedge counter 402 is input to a Write Control Store (WCS) sector timing logic 420. The WCS sector timing logic 420 may include a microcoded state machine that controls the time window during for reading the next servo sync word. The WCS sector timing logic 420 also includes timing circuitry responsive to the count output from the intra-wedge counter 402 to produce timing signals (such as data sector marks, for example) that control access to the addressable locations within the data sectors of the tracks written on the recording surface of the drive's disk. In effect, by periodically dropping clocks to the intra-wedge counter 402, a substantially constant count may be generated between the detection of servo sync words.

Figure 5:
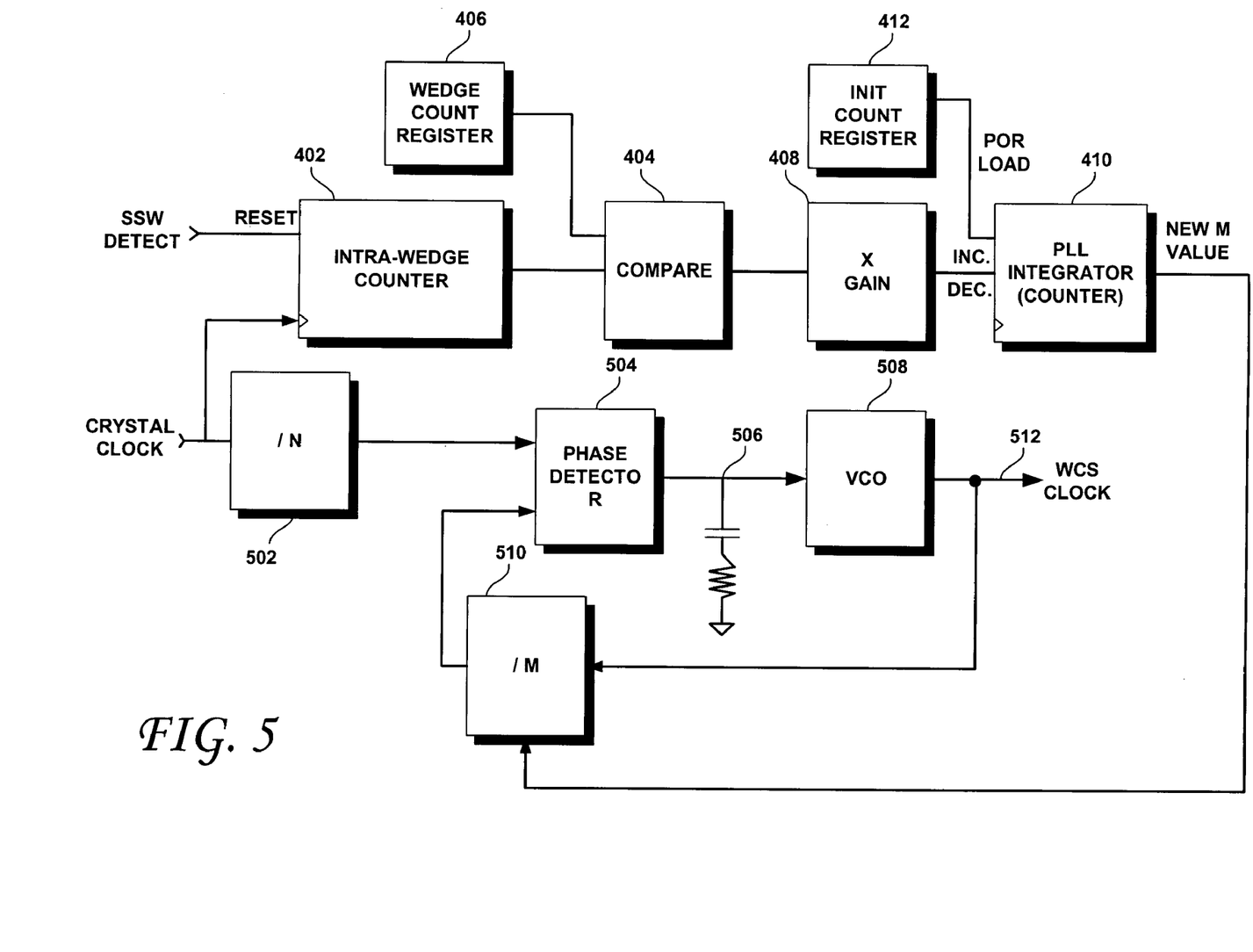
FIG. 5 is a diagram of a timing circuit for compensating for variations in the angular velocity of the drive spindle motor and for generating a time base clock signal adapted to provide the disk controller with a clock signal that tracks the spindle motor's variations in angular velocity, according to another embodiment of the present invention.

FIG. 5 is a diagram of a timing circuit for compensating for variations in the angular velocity of the drive spindle motor and changing a time base generator in accordance with such variations, according to another embodiment of the present invention. A detailed description of the elements of the timing circuit 500 that are identified with the same reference numerals that appear in FIG. 4 is omitted. Generally, the timing circuit 500 includes an intra-wedge counter 402 and a multiplier generating circuit for generating a multiplier signal M that varies according to the count in the intra-wedge counter 402. The multiplier generating circuit includes the elements 406, 404, 408, 412 and 410 described in detail above. According to this embodiment, a consistent wedge-to-wedge count is obtained by modifying the time base clock to the drive's controller (not shown). As shown in FIG. 5., the error output of the PLL integrator counter 410, characterized in FIG. 5 as an M value, is fed to a divide by M module 510 and sets the previous M value to the new value output from the PLL integrator counter 410. The lower portion of the timing circuit 500 resembles a PLL frequency multiplier circuit, in which time base clock output may be characterized as a signal whose frequency is a reference frequency multiplied by a multiplier M (which is the integrated error output of PLL counter 410). The reference frequency, output by the divide by N module 502, is equal to the frequency of the crystal clock that gates the intra-wedge counter 402 divided by N. In other words, $$f_{time\ base\ clock} = M * f_{Ref};$$

where $f_{Ref} = f_{crystal\ clock}/N$. Indeed, the phase detector 504, the filter 506, the Voltage Controlled Oscillator (VCO) 508 and the divide by M counter 510 together form a feedback control system that controls the phase of the VCO 508. The present reference frequency ($f_{Ref} = f_{crystal\ clock}/N$) is applied to one input of the phase detector 504. The other input of the phase detector 504 is connected to the output of the divide by M counter 510. Normally, the frequencies of both signals will be nearly the same. The output of the phase detector 504 is a voltage proportional to the phase difference between the two inputs. This signal is applied to the filter 506. In turn, the filtered signal controls the VCO 508. The output of the VCO 508 (the time base clock signal) is a signal whose frequency is M times the reference frequency input to the phase detector 504. This time base clock output signal of the VCO 508 is sent back to the phase detector 504 via the divide by M counter 510.

The PLL consisting of the phase detector 504, the filter 506, the VCO 508 and the divide by M counter is configured to acquire and track the reference signal of frequency $f_{Ref}$ and modifying it as M, the error output of PLL 476, changes. That is, as the wedge-to-wedge count changes as a result of variations in the angular velocity of the spindle motor, the frequency of the time base clock signal itself will change, tracking the signal reference signal and the error caused by the variations in the spindle motor's angular velocity. The filter 506's maximum slewing rate (a function of the bandwidth of the multiplier signal M) is designed such that the PLL frequency multiplier can maintain lock as the signal M varies along with the changes in velocity of the spindle motor. Although a first order RC filter is shown, it is understood that other and/or higher order filters may advantageously be used within the context of the present invention.

This timing circuit may also enable the changing of the PLL for the read channel and allow reading and writing when the disk is being spun up and has not yet reached its nominal speed. Moreover, the strict speed tolerances on the operation of the spindle motor may be more relaxed, thereby easing electronic and speed control requirements, both in terms of firmware and hardware.

Figure 6:
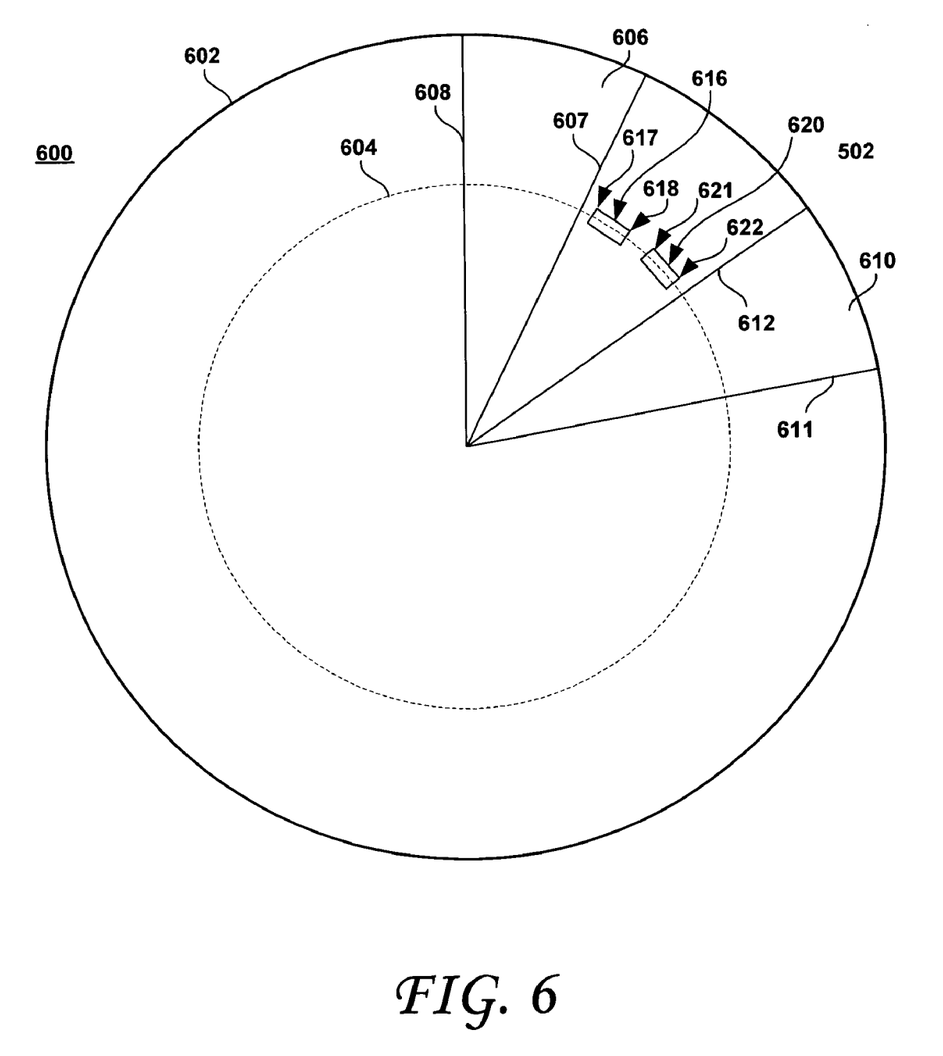
FIG. 6 is a diagram showing servo sectors and addressable locations between the servo sectors, to illustrate further aspects of the present invention.

FIG. 6 is a diagram showing servo sectors and addressable locations between the servo sectors of a track on the recording surface of a disk, to illustrate further aspects of the present invention. As shown, FIG. 6 shows a disk 602 and one exemplary track 604 thereof, although it is understood that a disk will many more tracks than shown in FIG. 6. Also shown are a first wedge 606 having a leading edge 608 and a trailing edge 607 and a second wedge 610 having a leading edge 612 and a trailing edge 611. For purposes of illustration, a first and a second addressable (i.e., via assertion of the Rgate or Wgate signals, for example) locations 616, 620 are shown on the track 604. The first addressable location 616 defines a leading end 617 and a trailing end 618 and the second addressable location 620 on the track 604 defines a leading end 621 and a trailing end 622. As shown, the first addressable location 616 has both its leading end 617 and trailing end 618 between the trailing end 607 of the first wedge 606 and the leading end 612 of the second wedge 610, the second addressable location 620 also having its leading end 621 between the trailing end 607 of the first wedge 606 and leading end 612 of the second wedge 610.

According to the present invention, the head of the drive may perform an operation (such as track following, for example) in which the head is maintained adjacent the track 604 and produces a read signal that has multiple servo phases and multiple data phases. During a first servo phase, the read signal produced by the head represents data read from the first servo wedge 606 and during a second servo phase, the read signal represents data read from the second servo wedge 610. If the drive's spindle motor velocity were constant, no variation in the elapsed time between the first and second servo phases would manifest itself, the elapsed time between the first and second servo wedges would be constant. However, actual spindle motors do not always operate at their rated nominal speed and measurable variations in angular velocity of the spindle motor occur. As detailed above, this causes a variation in the amount of time elapsing between the first servo phase and the second servo phase. A controllable clock generator (FIG. 4, without WCS sector timer logic 420) produces a stream of clock pulses having an adjustable pulse repetition frequency. The clock generator operates on a sampled-data basis to respond to the read signal to adjust the pulse repetition frequency during the servo phases so that during the data phases the pulse repetition frequency remains substantially constant and is a function of the angular velocity of the spindle motor. Timing circuitry (such as sector timer logic 420 in FIG. 4) responds to the clock pulses to produce timing signals to control access to the addressable locations. The clock pulses, therefore, are synchronized to previous wedge-to-wedge timings and compensates for variations in the angular velocity of the spindle motor. Advantageously, this enables more predictable control signals to be generated by the sector timer logic, which allows narrower guard bands around the data sectors (and shown in FIG. 7) and thus an increased disk capacity.

Figure 7:
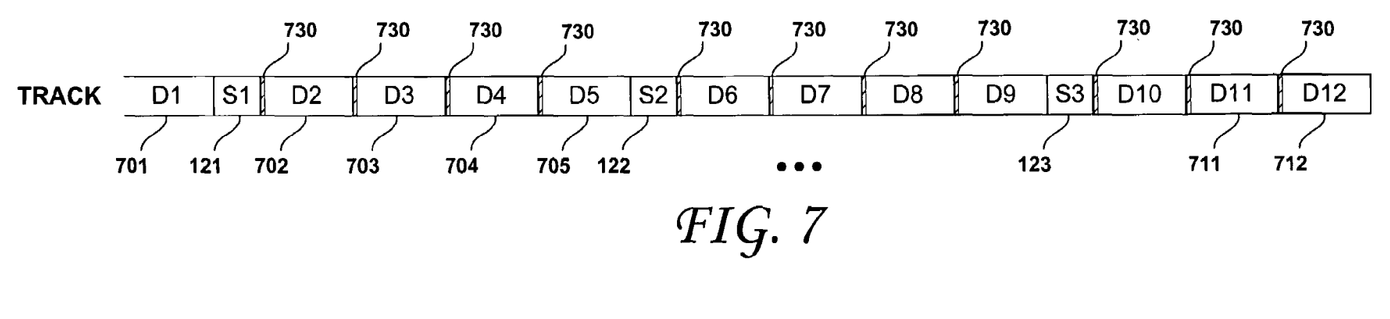
FIG. 7 is a representation of the structure of a track on the recording surface of a disk of a magnetic hard disk drive, in which the width of the guard bands has been reduced, according to the present invention.

FIG. 7 is a representation of the structure of a track on the recording surface of a disk of a magnetic hard disk drive, in which the width of the guard bands has been reduced, according to the present invention. As shown in FIG. 7, the width of the guard bands 730 may be reduced, as compared to the relatively larger width of the guard bands 130 shown in FIG. 1. Also, as the width of the guard bands 130 is reduced, the data sectors 701, 702 . . . 712 may be formatted to be correspondingly wider to enable more data to be stored in each data sector, thereby increasing the total capacity of the disk.

What is claimed is:

1. A disk drive, comprising:
   a spindle motor;
   a disk including a recording surface having a track that includes a first servo wedge including a first servo sync word and a first data sector including a first data sync word, and a second servo wedge including a second servo sync word and a second data sector including a second data sync word, the disk being driven by the spindle motor to rotate at an angular velocity that is subject to variation;
   a head for performing an operation in which the head is maintained adjacent the track and produces a read signal that has multiple servo phases and multiple data phases such that during a first servo phase the read signal represents data read from the first servo wedge and during a second servo phase represents data read from the second servo wedge, the variation in angular velocity of the spindle motor causing a timing variation in the amount of time elapsing between the first servo phase and the second servo phase;
   a clock for producing a stream of clock pulses;
   a controllable intra-wedge counter for maintaining a substantially constant count between the first and second servo sync words, an output of the intra-wedge counter controlling when a reading of the first and second data sync words is enabled; and
   a gated clock generating circuit coupled to the clock and responsive to the variation in the angular velocity of the spindle motor to periodically drop clock pulses from the stream of clock pulses to generate a gated clock signal that is input the intra-wedge counter, the gated clock signal causing the intra-wedge counter to increment when asserted and causing the intra-wedge counter to not increment when the gated clock signal is not asserted.

2. The drive of claim 1, wherein the gated clock generating circuit includes circuitry configured to compare an output of the intra-wedge counter with a comparison count value that corresponds to a fast spindle motor and wherein a result of the comparison determines whether the gated clock signal is asserted.

* * * * *